Oct. 9, 1934.　　　　L. MAISEL　　　　1,976,078
JOURNAL BALL BEARING
Filed Oct. 23, 1933　　2 Sheets-Sheet 1
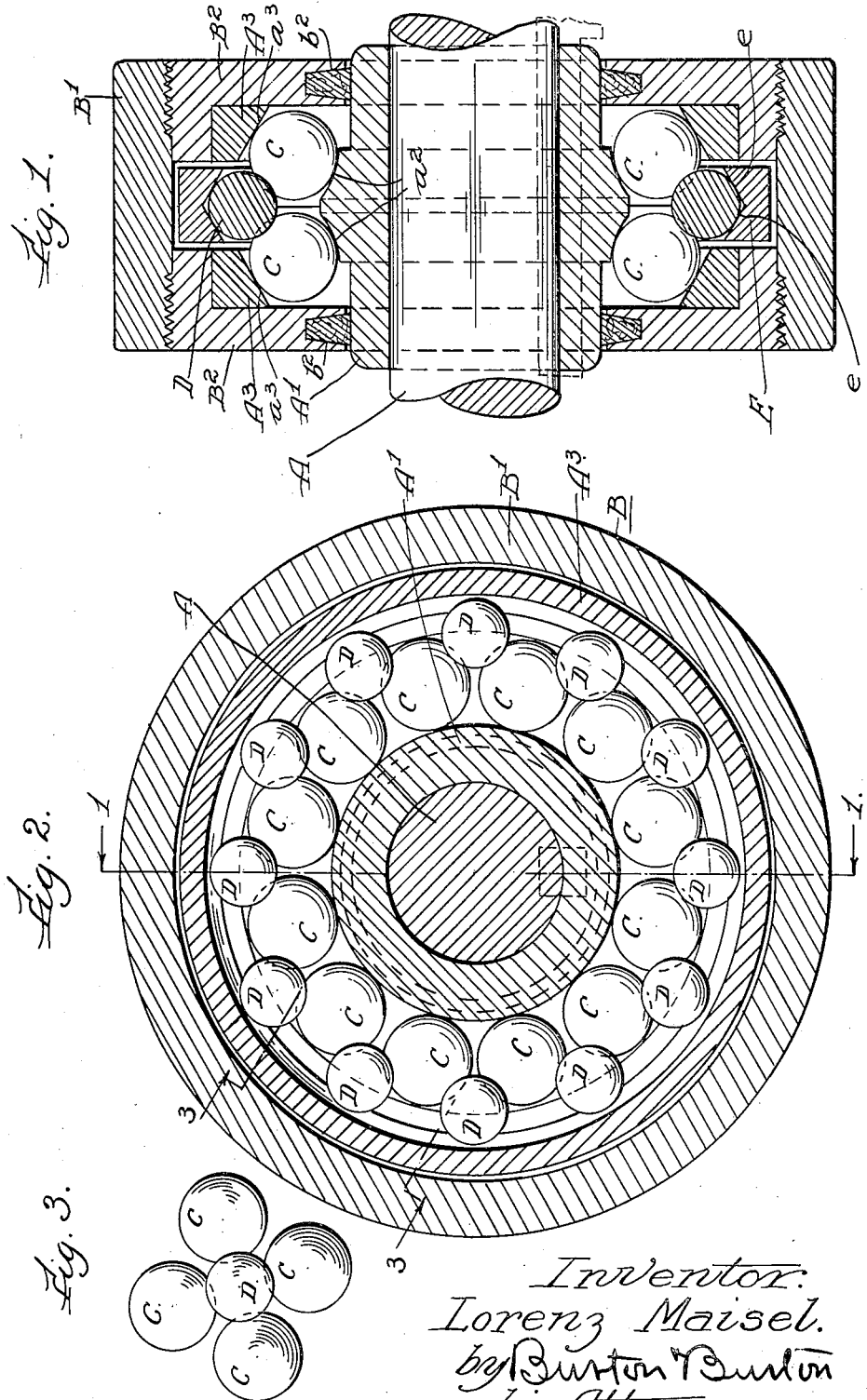
Inventor:
Lorenz Maisel.
by Burton Burton
his Attorneys.

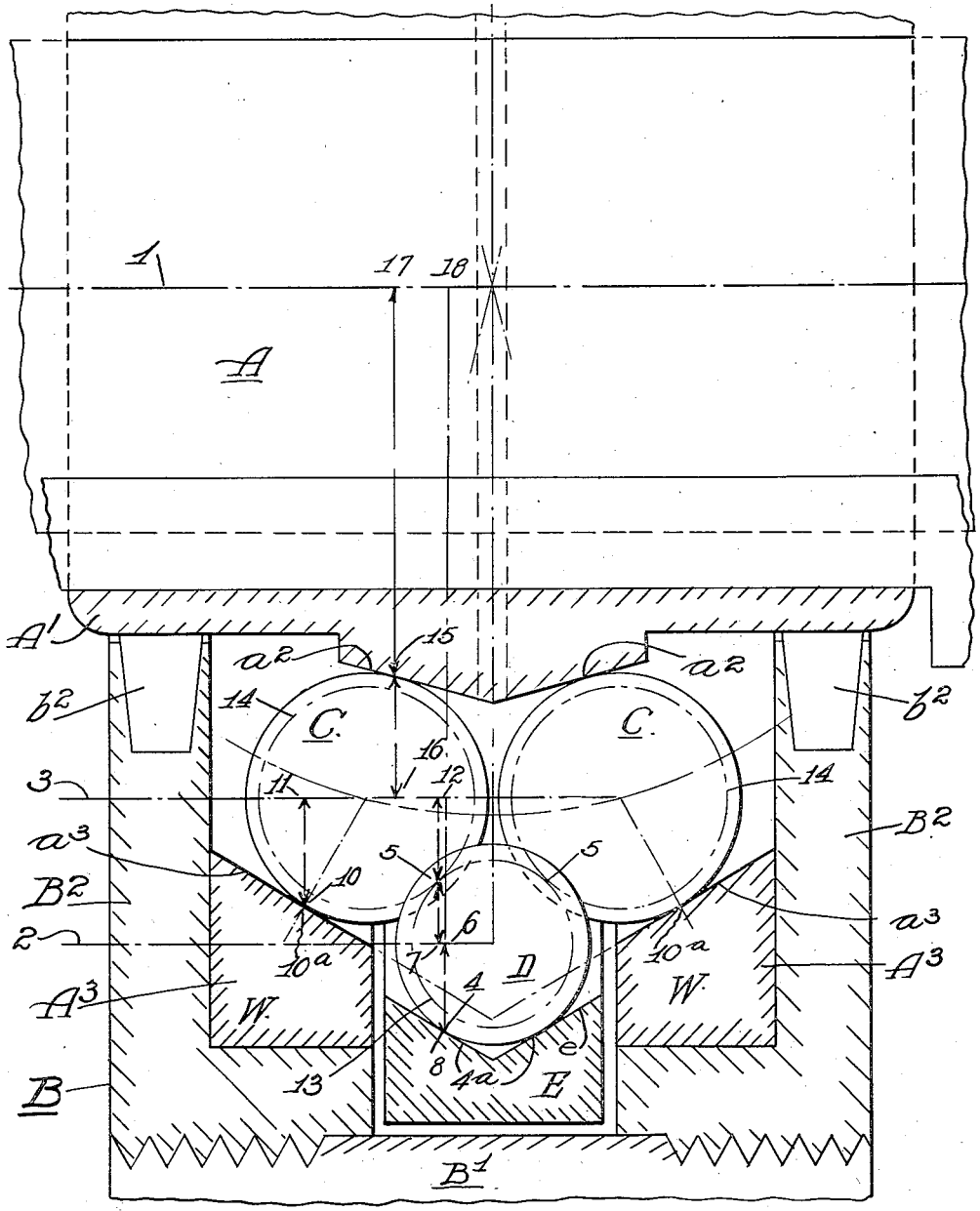

Patented Oct. 9, 1934

1,976,078

UNITED STATES PATENT OFFICE

1,976,078

JOURNAL BALL BEARING

Lorenz Maisel, Chicago, Ill., assignor, by mesne assignments, to Eureka Machinery Company (Limited) Trust Estate, Chicago, Ill.

Application October 23, 1933, Serial No. 694,714

5 Claims. (Cl. 308—200)

The purpose of this invention is to provide a ball bearing between two relatively rotating parts in which the consecutive balls being circumferentially spaced apart to avoid frictional contact between them, are held thus spaced by a supplemental circular system of balls instead of the customary "floating" ball cage, which, while serving to dispose the balls so that they are uniformly distributed around the journal bearing without being in immediate frictional contact successively, which would tend to defeat the purpose of a ball bearing for relieving friction,—involves a substantial amount of friction between the balls and the floating cage. The construction embodying the present invention is accordingly designed in respect to ball dimensions and spacing to avoid rubbing friction between the contacting balls as well as between the balls and the tracks in which they roll in the journal bearing.

A further purpose of the invention is to arrange the ball systems which take care of rotative friction so that the same ball systems receive the end thrust and take care of end thrust friction.

The invention consists in the elements and features of construction shown and described as indicated in the claims.

In the drawings:

Figure 1 is an axial section of a wheel and shaft equipped with ball bearings embodying this invention.

Figure 2 is a section at the line 2—2 on Figure 1.

Figure 3 is a detail diagrammatic plan view showing the balls as they might be seen in the plane indicated by the line 3—3 on Figure 2 with the adjacent parts of the structure omitted.

Figure 4 is a diagrammatic view on an enlarged scale showing the ball systems as to a radial axial plane.

Referring to the drawings in detail:

The shaft is indicated at A with a journal member, $A^1$, rigid therewith. The wheel journalled on the shaft is indicated in entirety at B, said wheel comprising a tread member, $B^1$, and ball-bearing casing members, $B^2$, $B^2$, in the form of cup-shaped collars screwed into the tread member at opposite sides having each at their inner circumference felt bushings, $b^2$, for seating on the journal, $A^1$, to seal the ball chamber formed between the two members, $b^2$, for retaining lubricant or rust-proofing fluid with which under some circumstances the chamber may desirably be charged.

The ball bearing comprises what may be referred to as the primary balls, and secondary or spacing balls. The primary balls consist of two circular groups or series arranged side by side and slightly spaced apart, both groups encompassing the journal, $A^1$, which is formed midway in the axial dimension of the wheel with what may be referred to as the inner cone bearing for the balls, indicated at $a^2$; and there is provided in each of the members, $B^2$, an exteriorly encompassing annular ball-track, $A^3$, tapered at the inner circumference, as seen at $a^3$, to afford tapered or conical seat for the balls, C, of the primary ball system which comprises the two parallel groups or series seated and rolling respectively in the conical seats, $a^3$, of the members, $A^3$, carried by the opposite casing members, $B^2$, respectively, and between said conical seats respectively and the inner cone-bearing element, $a^2$, of the journal, $A^2$. The angle of slope of the conical seat, $a^3$, on the track member, $A^3$, is related to the corresponding slope of the cone bearing, $a^2$, of the journal, $A^2$, so as to make the gap between the two bearings at opposite sides of the balls widen inwardly, so that the balls, dimensioned for fitting between the two sloping bearings at the inner side, are checked against moving outwardly as they might tend to do under centrifugal action when the wheel is revolving at high speed.

The balls of the primary system are dimensioned relatively to the circumference of the tracks in which they are seated for being circumferentially spaced apart a substantial distance, and for holding them thus spaced uniformly, there is provided the system of secondary or spacing balls, D. As shown, these spacing balls are somewhat smaller than the primary balls. The secondary balls are interposed between the two parallel groups of primary balls, as seen in Figure 1, and between consecutive balls of both groups or series of primary balls, as seen in Figure 2. For the balls of the secondary system there is provided an encompassing annular seating member or track, E, recessed angularly at its inner circumference to afford opposite tangential converging seats, $e$, for the balls between which converging seats the balls are definitely positioned all in the same plane transaxial with respect to the shaft A, and midway between the two series of primary balls, as may be understood from Figure 1.

It may be understood that the wheel of which the tread member is shown at $B^1$, represents any structure element rotatively related to a shaft journaled in it or on which it is journaled, and the secondary-ball-seating member or track member, B, is shown fitted non-rigidly in this tread member, B¹, so that it may be thought of as simply a cage for the secondary balls free to float on the secondary ball system and free to move rotatively with respect to the member, B¹, in which it is thus non-rigidly carried.

But the construction is designed in respect to the dimensions of its parts as hereinafter described, so that this track member, E, will thus float on the secondary ball system without being rotated thereby relatively to the wheel as an entirety, or to the tread member in which said track is non-rigidly fitted to any amount requiring consideration as tending to involve rubbing friction. And accordingly the track member, E, might be fitted in the tread member so as to be rigid with the wheel without materially affecting the operation of the ball bearing for avoiding rubbing friction at any seating of the balls of either system on each other, or on their tracks in either of the relatively rotative elements, shaft and wheel, and accordingly if mechanical skill could be relied upon to invariably dimension the parts relatively as indicated with such absolute accuracy as to obtain the mathematically exact relations necessary for such substantial avoidance of rubbing friction as indicated when the track member is non-rotatably carried in the casing. But in view of the liability to inaccuracy in the tooling of the several parts to desired dimensions, it is advisable to make the track member, E, as shown in Figure 1, which may be understood as showing it exteriorly dimensioned for loose or easy fit in the tread member or wheel of the casing of whatever form. When constructed in this manner, which independently of any dimensioning of the parts for avoiding rubbing friction between the balls and such a track, as the track, E, tends to effect such avoidance, the primary purpose accomplished and the advantage afforded by the present invention consists in that the relative dimensioning of the parts as above indicated and hereinafter particularly described, tends to prevent, and when perfectly accurate does practically prevent the track member, E, from being rotatively actuated by the rolling travel of the balls upon it, as it is liable to be in all previously constructed ball bearings, such rotative actuation in the case of a journalled shaft revolved at high speed having the effect of causing the outer bearing corresponding to the track, E, to acquire a speed much higher than the rotative speed of the shaft, and to "spin" around on the balls from which it initially derives its speed, with the effect of creating the rubbing friction with the balls and causing them to have rubbing friction with the inner journal of the shaft with which they have initially only rolling friction.

The primary and secondary balls are dimensioned as to diameter, and the primary balls of the two series are spaced apart laterally, and in each series spaced apart circumferentially, to admit the secondary balls between the primary balls to proper distance for adapting the secondary balls to hold the primary balls suitably spaced apart both laterally and circumferentially, and to adapt the secondary balls to interlap with the primary balls for making the contact between the balls of the two systems are circles defining the circumference of segments of the respective balls in planes transaxial of the shaft and offset from transaxial planes diametric with respect to the balls; so that the circles on the spherical surface of the balls at which rolling contact between the balls of the two systems respectively occurs are of less diameter than the balls; so that in the engagement of the secondary balls with the primary balls, the balls of both systems are rotated about axes parallel to the shaft axis.

It will be noted upon consideration of Figure 1 that the taper of the inner and outer bearings of the primary balls, causes the planes at whose intersection with spherical surface of the balls the rolling contacts of the balls with their bearings occur, to be offset laterally from diametric planes transaxial with respect to the shaft, so that the circles of rolling travel of the balls on their bearing tracks in the outer journal bearing or tread member, are the circumferences of segments of the balls, and therefore of less diameter than the balls. And it will be noted that as the balls of the two systems respectively are dimensioned and spaced, the circles of rolling contact of the primary balls in the inner and outer tracks respectively are variantly offset laterally from transaxial planes diametric with respect to the balls, the plane of the circle of rolling contact of the primary balls with the tangent outer seat, 10ª, being oppositely and more offset from the transaxial diametric plane than the circle of rolling contact of said balls with the inner seat, so that the first mentioned circles are of less diameter than the last. And it will also be noted that the circles of rolling contact of the primary balls with the secondary balls respectively are in transaxial planes offset from the transaxial planes diametric with respect to the primary balls a distance which is not the same as the distance at which the planes of rolling contact of the primary balls with their inner seats are offset.

The purpose and result of this differentiation in respect to the offsetting of the planes of rolling contact, and consequent differentiation in respect to the diameters of the circles defining the tracks of rolling contact, may be understood by tracing this feature through the construction, which may most easily be done by referring to the diagrammatic view Figure 4.

Referring to this figure, it will be noted that—

Line 1 indicates the axis of the shaft, A;

Line 2 is the axis of rotation of the secondary ball, D, in rolling on its track on the tread ring, B;

Line 3 is the axis of the primary ball, C, in rolling contact with the secondary ball, D;

4 denotes the point of contact of the secondary ball, D, with its track indicated at 4ª on the tread ring, B;

5 denotes the point of rolling contact of the secondary and primary balls with each other, which contact is at the circle, 13, of the secondary ball and the circle, 14, of the primary ball;

The distance 4—6 is the length of radius of the rotative movement of the secondary ball, D, about its axis, 2, in the plane in which it makes rolling contact with its track at 4;

The distance 5—7 is the radius of rotation of the secondary ball, D, about its axis, 2, in the plane in which it makes rolling contact with the primary ball at 5;

The distance 5—12 is the radius of rotation of the primary ball about its axis, 3, in the plane of contact of the primary and secondary balls, said contact occurring at 5;

The distance 5—16 is the radius of rotation of the primary ball about its axis, 3, in the plane of its rolling contact with its inner seat at the point, 15, on the journal, A¹, of the shaft, A;

The distance 15—17 is the radius of rotation of the shaft, A, in the plane of rolling contact with the journal, A¹, of the primary ball, C, (at 15);

The distance 4—18 is the length of the radius of the track of the ball, D, on the tread ring, E, which track is in the transaxial plane of said radius line 4—6.

The distance 10—11 is the radius of rotation of the ball, C, at its rolling contact with its track, W, at 10ª.

Now assuming relative rotation between the shaft, A, and the wheel or journal bearing of the shaft either by rotation of the shaft in the bearing, or by rotation of the wheel on the shaft, and considering that the ball system in entirety floats between the inner and outer journal bearings,— the inner being the tangent cone track, $a^2$, on the journal, $A^2$, and the outer being the annular inwardly conical tangent tracks, $a^3$ and $e$, if the rotary movement derived by the secondary ball, for example, from the track, $e$, is fully transmitted through the system by rolling contact of balls with balls to the inner track, $a^3$, of which the circumferential extent is a fraction of that of the outer track, $e$, the result will be circumferential rotary movement of the balls rolling on the inner track several times faster than that track is moving; and consequently the friction which might be thought to be postponed while the rotary movement is being transmitted through the ball system will be developed to the full extent at the inner bearing. Such result is prevented by the expedient shown in the construction as described, consisting in arranging the balls as to relative diameters and spacing, so that the secondary balls interlapping the primary balls make rolling contact with the latter at circles of less diameter, and so less circumference, than diameter and circumference of the balls; and arranging the journal bearing tracks on which the balls roll at the inner and outer bearings so that the balls contact the tracks in the same manner as the balls of the two systems contact each other, i. e., at circles offset from the diametric transaxial plane of the balls, the successive rolling-contact circles from outer to inner journal bearing being related as the gears of a speed-reducing train,—the rotation-receiving circle at each point of transmission being of greater diameter than the transmitting circle, the gross reduction of rotary speed from outer to inner journal bearing being made to correspond to the relative rotary speeds of the inner and outer journal bearings, which of course correspond to the diameters of said inner and outer bearings.

Referring again to the diagrammatic Figure 4, it may be noted that the radius of the circle on the secondary ball at which rotary movement is derived by rolling contact with the outer bearing, being the line 4—6, is greater than the radius of the circle on the primary ball at which the rolling contact between the secondary ball and primary ball occurs, the radius of that circle being the line 7—5; and that the radius of the circle on the primary ball (line 5—12) at which rotary movement is communicated to the primary ball from the circle of the secondary ball whose radius is 7—5, is very substantially greater than said radius 7—5; and that the radius of the circle on the primary ball from which rotary movement is communicated to the inner journal bearing, being the radius 15—16, is a fraction of the radius of the inner journal bearing, said last mentioned radius being seen at the line 15—17.

In the structure as shown with approximate accuracy in this diagrammatic view, as between the outer bearing track, $4^a$, and the secondary ball, the transmitting radius 7—5 is seven-ninths (7/9) of the receiving radius 4—6; as between the secondary ball and the primary ball the transmitting radius 5—12 is seven-tenths (7/10) of the receiving radius 15—16; thus making the rotary speed of the primary ball at its rolling contact with the inner journal bearing forty-nine ninetieths (49/90) of the rotary speed of the secondary ball at its rolling contact with the outer journal bearing. And this is almost the exact ratio of the radius of the inner journal bearing and of the length of the circular track of rolling contact of the primary ball with the inner journal bearing to the length of the circular track of rolling contact of the secondary ball with the outer journal bearing, so that the balls cover their respective courses at outer and inner journal bearings respectively by rolling thereon without slipping, and thus without rubbing friction between the balls and the journal bearings, while also transmitting rotary movement from secondary ball to primary ball by rolling contact without slipping and so without rubbing friction between the balls.

It should be further noted that since to avoid rubbing friction between the secondary balls and the primary balls while also avoiding rubbing friction between the balls of both systems and their respective tracks, the speeds of the secondary and primary balls at their respective circles of rubbing contact with each other, must be the same, it follows that the ratio of the radius of the contact surface of the secondary ball with the primary ball (referring to diagrammatic Figure 4) to the radius of the contact circle of the secondary ball with its track must equal the ratio of the radius of the circle of contact of the primary ball with the secondary ball to the radius of the circle of contact of the primary ball with its track.

And this last mentioned ratio is obtained by making the slope of the converging tracks, $e^3$, of the outer journal bearing such as to locate the point of tangency of said track with the ball as seen at 10, making the radius of the contact circle of the secondary ball with its track, as seen at the line 10—11.

I claim:

1. A journal ball bearing structure comprising a shaft having a journal equipped with inner oppositely conical tapered seats for two cooperating systems of spherical balls; two systems of balls arranged facing each other and seating inwardly on said inner oppositely tapered seats respectively outwardly thereof, said journal being devoid of obstruction to the outward movement of said balls; a casing including a journal bearing enclosing the ball systems, said journal bearing comprising at opposite outer sides of the balls systems respectively annular interiorly conically tapered seats exteriorly encompassing the ball systems respectively, on which the balls of said systems seat inwardly thereof, said journal bearing being devoid of obstruction to the inward movement of the balls; a secondary ball system comprising balls to the number of the balls in each of the first mentioned ball systems, said secondary balls being individually dimensioned for entering between the consecutive balls of each of the two systems respectively and between the opposite corresponding balls of the two systems for constituting obstruction to the inward movement of the balls of said two cooperating systems and seating the balls of the secondary system on the balls of the first mentioned system for rolling contact of the balls of the secondary system with the balls of the first mentioned system, the casing having an annular seat member with a track for the balls of the secondary system circumferentially encompassing and laterally embracing the same.

2. In the construction defined in claim 1, the casing member which carries said exteriorly encompassing conically tapered ball seat being mounted in the casing for adjustment in axial direction along the journal for closing the two first mentioned ball systems together upon the secondary interposed ball system and the annular encompassing seat for the secondary ball system being interiorly recessed for admitting the balls and retaining them against lateral displacement in said encompassing seat in such manner that longitudinal thrust of the shaft is transmitted to the said encompassing seat through the balls of the secondary system.

3. The construction defined in claim 1, the inner conically tapered ball seats on which the balls seat outwardly thereof and the outer conically tapered ball seats on which the balls seat inwardly thereof having their respective slopes for effecting the taper at different angles to the shaft axis, the slope of the outer seats being at a greater angle to the shaft axis than that of the inner seat, whereby the seats converge outwardly for embracing the primary ball systems against spreading apart.

4. A ball bearing for relatively moving parts comprising in combination with endless ball tracks carried by said relatively movable parts respectively, a system of individually independent balls arranged in succession for rolling individually between said tracks in rolling contact with one of the tracks, and means for maintaining the successive balls of said system spaced apart in their order of succession, said means consisting of a second system of individually independent balls individually interposed in their order of succession between the correspondingly successive individual balls of the first mentioned system in rolling contact therewith and with the other of said tracks, the balls of the two systems being individually dimensioned as to the circles of their spherical surface at which they roll on their respective tracks, and as to the circles of their spherical surface at which they have rolling contact each with balls of the other system, so that the ratio of the radius of the circle of rolling contact of the balls of one system with the track of that system to the radius of the circle of contact of the balls of that system with the balls of the other system substantially equals the ratio of the radius of the circle of contact of the balls of the other system to the radius of the circle of contact of the balls of said other system with the balls of the first system.

5. A ball bearing for relatively moving parts comprising in combination with endless ball tracks carried by said relatively movable parts respectively, a system of individually independent balls arranged in succession for rolling individually between said tracks in rolling contact with one of the tracks, and means for maintaining the successive balls of said system spaced apart in their order of succession, said means consisting of a second system of individually independent balls individually interposed in their order of succession between the correspondingly successive individual balls of the first mentioned system in rolling contact therewith and with the other of said tracks, the tracks of the two ball systems being circular, the balls of the two systems being individually dimensioned as to the circles of their spherical surface at which they roll on the respective tracks and as to the circles of their respective surfaces at which they have rolling contact with each other so that the product of the ratio of the radius of the superficial circle of the balls of one system at which said balls roll on the track of that system to the radius of the superficial circle of the balls of that system at which they make rolling contact with the balls of the other system by the ratio of the radius of the superficial circle of the balls of the other system at which said balls roll on the track of said other system to the radius of the superficial circle of said balls at which they making rolling contact with the balls of the first system practically equals the ratio of the radius of the track of the first system to the radius of the track of the second system.

LORENZ MAISEL